July 11, 1944.  W. S. KINNARD  2,353,475

PHOTOMETER

Filed April 25, 1941  2 Sheets-Sheet 1

INVENTOR
WOLCOTT S. KINNARD
BY
Wheeler, Wheeler & Wheeler
ATTORNEYS.

July 11, 1944.  W. S. KINNARD  2,353,475

PHOTOMETER

Filed April 25, 1941  2 Sheets-Sheet 2

INVENTOR
WOLCOTT S. KINNARD
BY
Wheeler, Wheeler & Wheeler
ATTORNEYS.

Patented July 11, 1944

2,353,475

UNITED STATES PATENT OFFICE 2,353,475

PHOTOMETER

Wolcott S. Kinnard, Whitefish Bay, Wis.

Application April 25, 1941, Serial No. 390,263

20 Claims. (Cl. 88—23)

This invention relates to improvements in photometers, with particular reference to photometers for photographic purposes.

It is a primary object of the invention to provide a photometer with dual adjustments and control means therefor so interacting as to give direct readings not only of the proper timing of a photographic exposure, but also the proper sensitized medium or manipulation to be used for such an exposure. In other words, it is my primary purpose to provide in conveniently usable form a photometer having two light balancing means correlated to give a direct reading, in whatever terms desired, of the differential between any two sources of illumination together with a reading in absolute terms of the light from at least one source.

The photometer used is preferably one employing the "grease spot" principle of balancing illumination, though this is not necessary the case. In photometers employing this principle it is possible to extinguish the spot either by varying the intensity of one light source, or by moving one light source to and from the spot, or by introducing a light wedge or graduated gray scale between one light source and the spot, or by adjusting a diaphragm or equivalent to vary an aperture intervening between one light source and the spot.

Each of these four types of adjustment is known to the art and each has the effect of varying the intensity of illumination of the spot from the controlled source. For the broad purposes of the present invention any one of these four arrangements might be employed for any of the adjustments used in accordance with the present invention. Moreover, as above indicated, one or more photoelectric cells might be used instead of a spot and any one of the various adjustments above described might be employed, (or the energization of one cell might be varied) to vary the indication of response according to the intensity of the source.

Regardless of whether the "grease spot" principle is employed, and regardless of the means used to control the illumination, it will be understood that broadly it is a primary object of the invention to provide separate means successively operating to control illumination, and dials so connected to the separate means and so interacting as to give direct reading of the proper exposure and the proper sensitized medium (or proper development or choice of filter in cases where these control contrast).

It is a further important object of the invention to provide a photometer peculiarly adapted to give readings suitable for photographic purposes by reason of a color filter imposed upon light from the known source, preferably by direct pigmentation of the translucent spot, while the adjacent opaque area is left white. This has the effect of making any unbalance more easily perceptible.

Another object of the invention has to do with the compact simplified mechanical assembly of a photometer useful particularly for determining exposure and grades of paper or procedure in contact printing, enlarging, or projection printing; and a similar mechanical organization particularly useful in determining proper exposure for camera film or plate and for determining color intensity and quality. A further object of the invention mechanically is to provide a photometer organization in which the lighting of a photometer lamp automatically breaks the circuit to the safe light or other sources of illumination whereby interference with correct reading of the photometer is precluded.

A further object is generally to simplify and improve the construction, arrangement and operation for one or more of the purposes mentioned, and still other objects will be apparent from the specification.

In the drawings.

Like parts are identified by the same reference characters throughout the several views.

The photometer first to be described is illustrated in Figs. 1 to 9 and is particularly designed for use in projection printing or enlarging. The case 20 is provided with a closure 21 which serves as a support for a rivet 22 upon which I pivot the various adjustable dials hereinafter to be described.

Elbowed bracket 23 fastened to the bottom of the case supports a conventional bayonet socket 24 in which there is a lamp bulb 25.

Figure 8:
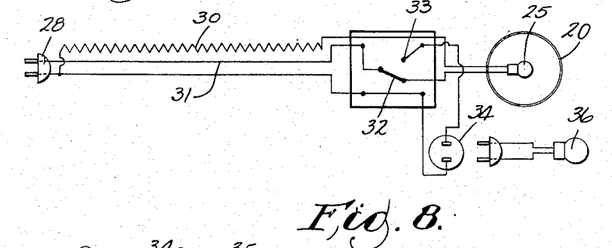
Fig. 8 is a wiring diagram of the electrical connections employed.

Electrical leads connected to the terminals 26 and 27 are supplied with current from plug 28 through a flexible conduit which includes a fixed resistor 30 leading to one of such terminals and a conductor 31 leading to the other, subject to the control of a double throw switch 32 (Fig. 8) which, in one position, closes the circuit to bulb 25 as shown in Fig. 8 and, in another position, closes the circuit to terminal 33 which supplies receptacle 34 to which a dark room safe light 36 may be plugged, the arrangement being such that the safe light is extinguished when the circuit is closed to bulb 25 and the circuit to the safe light is closed when bulb 25 is extinguished. A snap switch will ordinarily be used at 32, the snap feature not being illustrated in the diagram.

Figure 9:
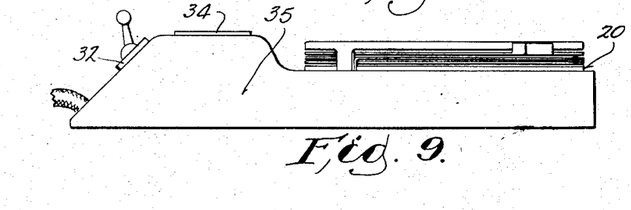
Fig. 9 is a side elevation of a modified mechanical embodiment of the invention.

The switch assembly and receptacle may be separate if desired, or they may be assembled in a single unit as shown in Fig. 9 where the entire photometer is assembled in a housing 35 which also carries the switch 32 and the receptacle 34.

In either event the resistance cable 30 is preferably of such a nature as to reduce the line voltage supplied to plug 28 to a level well below the rated voltage of the lamp 25. For instance, if the lamp 25 is rated as a 6 volt lamp, the resistor 30 should be of sufficient ohmage to reduce the actual voltage supplied to the lamp to about 4 volts. By operating the lamp well below its rate of voltage it is possible to have it operate for longer periods of time than as if the bulb were operated by full rate of voltage and at the same time the intensity of the light given by the bulb will tend to remain constant. The resistance cord is preferred because of simplicity and low cost to other ways of reducing voltage to the desired values.

The construction of the photometer dials is as follows:

To provide a fixed dial, a bezel ring 37 is provided with arms 38 screwed to the closure 21 as a means of supporting the bezel ring in spaced relation to the case 20 and the closure 21. Bezel ring 37 is spun over upon the margins of a paper dial sheet 40, a transparent cover disk 41 therefor, and a sheet metal backing plate 42. In practice the cover disk 41 may be made of cellulose acetate film. The dial 40 is a disk of paper or the like and the sheet metal 42 provides the necessary support. This is just one way of making the dial instead of printing directly on the sheet metal 42 or the back side of the transparent disk 41 the material now carried by the paper.

Figures 1, 2, 3, 4, 5, 6, 7:
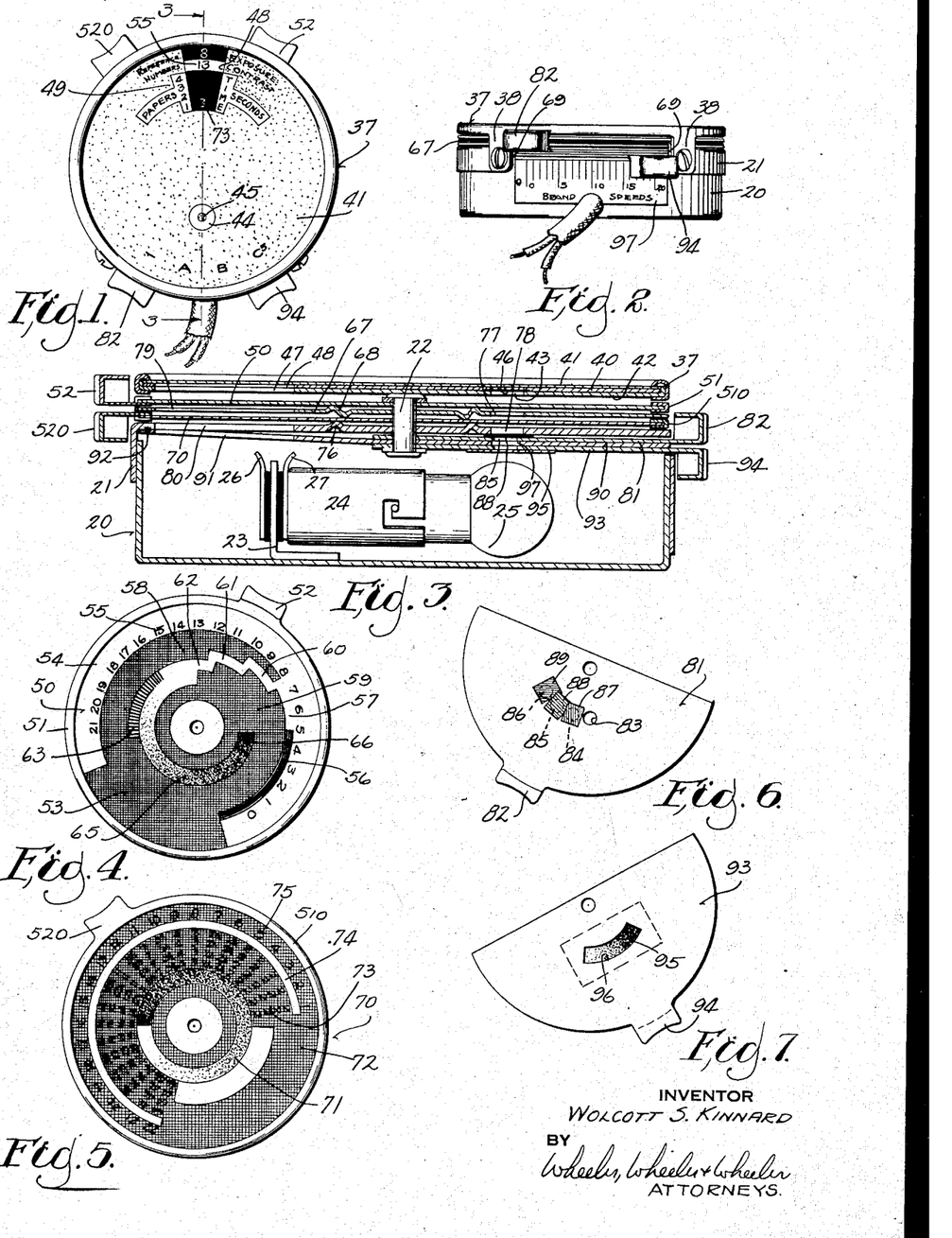
Fig. 1 is a plan view of a photometer embodying my invention.
Fig. 2 is a side elevation of the photometer shown in Fig. 1.
Fig. 3 is an enlarged detail view of the photometer as it appears in section on line 3—3 of Fig. 1.
Fig. 4 is a view on the scale of Fig. 1, showing the first adjustable disk below the top plate as it appears in plan.
Fig. 5 is a view similar to Fig. 4, showing the second adjustable disk below the top plate.
Fig. 6 is a view similar to Fig. 4, showing a third adjustable disk.
Fig. 7 is a view similar to Fig. 4 showing a fourth adjustable disk.

The sheet metal supporting plate 42 has an aperture 43 for the illumination of the photometer spot 45 on the cover or face plate 41. The spot is preferably circular in form as indicated in Fig. 1, and situated directly above the filament of the bulb 25. It is preferably tinted blue or gray. Surrounding the spot on disc 41 is an annular area 44 which is substantially opaque and preferably white. The spot 45 is translucent. Intervening between the supporting plate 42 and the stationary dial 40, is a piece of colored film at 46 (Fig. 3) which is so tinted as to correct for the reddish color of the illumination supplied by bulb 25 when the bulb is operated at less than its rate of voltage. If the spot coloration is neutral I may use a "process blue" filter at 46, (minus red and slightly minus green) although the coloration may be incorporated in the tinting of the spot 45 itself.

In addition to the aperture 43 which permits illumination of the spot, the plate 42 is provided with a wedge-shaped opening at 47 above which the stationary dial is also windowed at 48 (Fig. 1 and Fig. 2). At one side of the window 48 the stationary dial 40 is printed at 49 with symbols such as numbers 1, 2, 3, 4, having reference to different grades of printing paper. The window 48 and the stationary dial and the underlying opening 47 in the supporting plate permit inspection through the transparent cover sheet 41 of the underlying dials in the manner hereinafter to be described.

The head of rivet 22 is entirely concealed by the stationary dial assembly first described. Pivoted upon this rivet and confined beneath its head, are a series of dials including the top dial 50 which is separately illustrated in plan in Fig. 4 and may conveniently be made of film having a channeled marginal binder 51 for its reinforcement. A metal tab 52 connected with the binder provides a convenient means for adjusting the dial 50 angularly about its pivot upon the rivet or post 22.

The dial 50, as best shown in Fig. 4, is partially transparent and partially opaque. The shaded area 53 is opaque. Extending peripherally around most of the shaded area is a transparent area 54 on which there is a series 55 of symbols which, in practice, may comprise reference figures from 0 to 21 which are used for indicating comparative contrast. Radially within figures 0 to 5 I provide a zone 56 in which there are circumferential lines drawn about the axis upon which the dial is adjusted. Within the figures 5 to 8 there is a transparent area 57 serving as a window through which the figures on an underlying dial hereinafter to be described become visible when registered therewith. The opaque area 53 has an arcuate extension at 58 and another arcuate extension at 59 between which there are transparent areas 60, 61 and 62, radially staggered and communicating with each other in a sequence which includes the transparent area 57 already described. Circumferentially contiguous to the innermost of these transparent areas 62 is an area at 63 in which there are radial lines. Thus the radially staggered series of transparent arcuate areas is bounded at one end by the radial lines 63 and at the other end by the circumferential lines 56.

Within the innermost transparent area 62 and the lined area 63 just described, I provide a neutral density wedge 65 which, adjacent the transparent area 62, is completely transparent and gradually increases in density to a maximum density at its end 66 where it is practically opaque and virtually merges with the opaque area 53 at an extension portion thereof 59.

Immediately beneath dial 50 is a spacer disk 67 provided with an annular spacing rib 68 and having arms 69 (Fig. 2) underlying the arms 38 which support the bezel ring 37. The same screws which anchor arms 38 will also anchor arms 69 to the case closure. This disk 67 serves as a fixed spacer or washer between the adjustable dial 50 and an underlying adjustable dial 70 to prevent the motion of one dial from being communicated to the other.

The rotatable dial 70, pivoted upon the rivet or post 22, is shown in detail in plan in Fig. 5. Like dial 50, this dial has a reinforcing marginal channel at 510 connecting to a metal tab at 520 for convenient manipulation of the dial angularly about its pivot.

Directly beneath the density wedge 65 of dial 50, dial 70 is provided with a similar density wedge at 71 which, like density wedge 65, increases in density counter-clockwise as viewed in plan. Outside of the density wedge 71, dial 70 is generally opaque as indicated at 72. The opaque area immediately outside of the density wedge is provided with four circumferential rows of numbers or symbols indicative of time of exposure. In practice, existing grades of paper being as they are, I have found it appropriate that the corresponding numbers of each circumferential row should be alike so that in radial directions the numbers are identical in the several rows. These numbers are made up of clear areas in an opaque background and are, therefore, just the converse of the symbols used at 55 on dial 50. The table of symbols indicative of time of exposure is generically designated by reference character 73.

Immediately outside of the table of exposure characters 73 is an arcuate transparent area 74 which registers with the table of symbols 55 of dial 50 (Fig. 4). Outside of the arcuate transparent area 74 (which might constitute an open slot) is another series of symbols which are transparent on an opaque background, this series being designated by reference character 75. This series of symbols registers with the clear space which in Fig. 4 lies outside of the series of symbols designated by reference character 55.

The rotary dial 70, just described, rests directly upon the upper surface of closure 21 and is confined between the closure and the spacer 67. The closure, like the spacer, preferably has an annular rib, this rib being designated by reference character 76. Immediately beneath the aperture 43 of the outer supporting plate of the stationary dial the spacer 67 and the closure 21 are provided with apertures 77 and 78 respectively (Fig. 3). Beneath the window openings 47 and 48 of the supporting plate 42 and the stationary dial 40, the spacing washer 67 is provided with a window opening 79 and the closure 21 is provided with a window opening 80.

Beneath the closure plate are dials for more limited movement and shown in detail in Figs. 6 and 7. Both are pivoted on the rivet post 22 where it projects through the closure.

Dial 81, Fig. 6, is a filter dial. Preferably being made of thin sheet metal rather than film, it requires no reinforcing marginal channel but is provided with an integral tab at 82 for its adjustment. The filter dial 81 has a series of apertures 83, 84, 85 and 86 which, in various angular adjustments of the filter dial, may be registered with the apertures through which light is communicated to the spot. Aperture 83 is preferably left entirely open. Apertures 84, 85 and 86 are covered by colored filters 87, 88 and 89 respectively, any one of which may be used to tint the light transmitted to the spot for purposes hereinafter to be described.

Underlying the filter dial 81 is a stationary washer 90 windowed at 91 and welded at 92 to the inner surface of closure 21. By the spot weld at 92 and by engagement over the post 22, the spacer washer 90 is fixed as to position and prevents motion from being communicated from filter dial 81 to the underlying calibrating dial 93.

The calibrating dial 93 is shown in detail in Fig. 7. Like dial 81, it is preferably made of sheet metal and its tab 94 is integral. It has a short gray scale or density wedge at 95.

The gray scale or density wedge 95 may comprise a separate piece cemented to the underside of the calibrating dial 93 as shown in Fig. 3 where it underlies an arcuate opening 96, which is adjustable beneath an aperture 97 in the stationery washer 90.

When the parts are assembled in the manner shown in Fig. 3 and above described, there will be at all times three density wedges interposed in series between the bulb 25 and the spot 44 to be illuminated. In addition there is the permanent affixed corrective filter at 46 interposed in this series and, moreover, one or another of the color filters 87, 88 or 89 may optionally be interposed.

The stray light delivered to the interior of the casing from the bulb 25, is used to illuminate the several symbols in the manner now to be described.

The mode of use is as follows:

The instrument, the thickness of which is necessarily greatly exaggerated in the drawings, is actually very thin and compact. It is placed upon the enlarging easel. The upper movable dials 50 and 70 are set at their extreme counterclockwise positions, as is the lower dial 93. The second lowest dial 81 is set at its extreme clockwise position in which it is illustrated in Fig. 6.

In these positions of the several dials the path of illumination between the bulb 25 and the spot 45 is entirely clear save only for the filter 46 which corrects the color temperature of the bulb 25 due to the operation thereof below its rated voltage. Beginning next to the bulb, the clear end of the density wedge 95 will be immediately above the bulb, passing light through slot 96 in semi-dial 93. Over this will be the aperture 97 in the spacer 90. Over this will be the aperture 83 in the semi-dial 81. Next, the light will pass through the aperture 78 in the closure 21 of the case 20.

Above closure 21, the light will pass through the clear end of density wedge 71 in dial 70. Above this the light will pass through the aperture 77 in the spacer 67. Above the spacer the light will pass through the clear end of the density wedge 65 of dial 50. Next, the light will pass through the aperture in the stiffening plate 42 and then through the filter 46, thereby reaching the translucent area 45 comprising the spot.

The entire surface of the stationary dial 40 including both the opaque portions thereof (including the annular dot 44) and the translucent central spot 45, will be illuminated by any light falling thereon from an extraneous source. Due to the fact that the safe light is connected through switch 32 to the inner dial alternatively with the photometer bulb 25, the arrangement will be such that the only extraneous light falling on the face of dial 40 will be that from the projector or enlarger—in other words the light to be measured, which, in accordance with dark room practice, will be projected onto the easel and the instrument through a projection transparency such as a negative.

Calibrating dial 93 is now adjusted to provide a datum setting for the particular materials used. There is a scale 97 of brand speeds attached to the outside of case 20 as shown in Fig. 2. Assuming that the device is being used for enlargement, the tab 94 will be adjusted along scale 97 to the setting corresponding to a predetermined rating of the brand of enlarging paper to be employed. Such ratings must be determined, in the first instance, by trial and error, but may be furnished by the manufacturer of the instrument so that the user can immediately set the calibrating dial 93 to the proper position for any given brand of enlarging paper.

However, it may be necessary to make further adjustments of the calibrating dial 93 in either direction from the indicated point appropriate for the particular brand speed. The color temperature of the source of light in the enlarger or projector may be such as to require some compensation. Moreover, some film developers impart a color tint to the film for which compensation must be made. While any correction required for these factors may be very small, nevertheless the calibrating dial 93 affords an opportunity for correction to give perfect results after the correct dial setting for the materials used has once been determined by trial and error.

The calibrating dial being set, the instrument will now give uniformly accurate data with respect to enlargements of any size so long as the same materials and apparatus continue to be used. Assuming the calibrating dial to be properly set, the next step involved is as follows:

The instrument is adjusted upon the easel until the circular spot 45 is positioned beneath the brightest light projected through the negative upon the easel. (Skilled operators may prefer to use a less brilliantly illuminated portion of the image for special results.) With the upper rotatable dial 50 stationary in its extreme counter-clockwise position, the second rotatable dial 70 (illustrated in Fig. 5) is adjusted to rotate its gray scale 71 beneath the spot until the spot is extinguished, the light supplied by the photometer bulb 25 through the gray scale exactly balancing the light of the image projected onto the spot from the enlarger. Dial 70 is left in this position.

Leaving dial 70 in the position representing the point at which the spot was extinguished under the brightest portion of the image, the instrument is now moved to register the circular spot 45 with the darkest portion of the projected image. At this point the spot will again be visible in the less brilliantly illuminated portion of the projected image. The top dial 50 (Fig. 4) is now manipulated clockwise to move its gray scale 65 beneath the spot until the spot is again extinguished. Thus the position of this dial will indicate the differential between the brightest and darkest portions of the projected image.

The adjustment of dial 70 will have determined the proper exposure time as represented by the column of figures 73. The appropriate figure will have been moved into the window 48 of the stationary dial 40. However, when dial 50 is adjusted, the series of clear spaces 57, 60, 61, 62, will be moved over the tables 73 of dial 70 so that in the final adjustment only the figures of one arcuate series in table 73 will be visible. This is illustrated in Fig. 1 where the clear area 62 of dial 50 has registered with the innermost arcuate series of figures of table 73 to indicate an exposure time of three seconds. The fact that the clear area 62 has registered only with the arcuate series which is innermost in table 73, will register the correct exposure time of three seconds opposite figure No. 1 in table 49 of the stationary dial 40 as shown in Fig. 1. Since the particular position of dial 50 is a function of the difference between minimum and maximum illumination of the image as projected through the particular negative under consideration, and since this difference is considered in terms of contrast and should bear a predetermined relation to the degree of contrast of enlarging paper to be used, it would follow that the instrument, adjusted as above described, will show that for best results a paper of No. 1 contrast should be used and exposed to the projected image for three seconds.

With less differential between the highlights and shadows of the projected image any one of the clear areas or windows 61, 60 or 57 of dial 50 might be registered with the appropriate exposure time of table 73 on dial 70. In any such case, the exposure time would remain unchanged but the position in which the exposure time will be shown through the window 48 of stationary dial 40 would vary according to the degree of contrast so that the correct paper to be used might be No. 2 or No. 3 or No. 4, as the case might be.

In general, enlarging papers are only made in standard grades. If, after the dials have been adjusted as above described, the exposure figure is crossed by the arcuate lines 56, the negative has been under-developed or not correctly exposed and will give an undesirably flat print on even the most contrasting paper available. On the other hand, if the exposure figures are crossed by radial lines 63 of dial 50 (Fig. 4) the negative will be shown to have been over-developed and should be reduced for proper contrast, as otherwise the enlargement will be too contrasting even on the softest available paper.

If a particular exposure is desired, it is possible to use the instrument by setting the exposure dial 70 arbitrarily to a point where the desired exposure time appears in window 48 at stationary dial 40 and then adjusting a diaphragm or neutral density filter on the enlarging projector until the spot is extinguished. Exposure times of between 10 and 15 seconds will permit the spot to be more easily seen than as if the diaphragm of the projector is so stopped down as to make the exposure prolonged. The timing at an exposure of 10 or 15 seconds will be more accurate than on shorter exposures, consequently there is some advantage in keeping the diaphragm of the projector adjusted so that regardless of the degree of enlargement the exposure time will fall somewhere in the range between 10 and 15 seconds.

The figures in scales 55 and 75 on dials 50 and 70 respectively, are reference figures which skilled workers will find useful. They are not needed for determining the proper time of exposure. They appear in window 48 of the stationary top dial 40 as shown in Fig. 1, the upper figure being a figure on scale 75 of dial 70 and being a reference figure indicating relative exposure. The inner figure which happens to be 13 in Fig. 1, is a figure appearing on scale 55 of dial 50 and is a reference figure indicating relative contrast.

The dial 81, not thus far described as to function, is primarily intended for use in making color separation prints. For ordinary enlargements this dial is not used, although the filters 84, 85 and 86 might be replaced by a neutral density wedge to supplement the preliminary datum adjustment achieved through the manipulation of dial 93. In practice, however, the filters 84, 85 and 86 are interposed to impart color to the spot corresponding to the color of the image as projected on the easel through filters of the type required for color separation. The appropriate designations of the filters are indicated by the symbols "A," "B," "C5" which appear on the face of the stationary dial 40. Since the filters used preferably pass more light than the filters used on the projectors in making color separation negatives, it is necessary, in order to obtain a correct reading, first to use on the projection lens a filter corresponding in color and density to that of the instrument and bearing a predetermined relation to the filter actually to be used for projection exposure. Then after taking the reading the filter used on the lens for the reading is replaced by the sharper-cutting filter required for exposing the projection negative and the time of exposure is determined by multiplying the instrument reading by a factor representative of the aforesaid relation between the test filter and the exposure filter.

The bulb 25 supplies sufficient illumination to the interior of case 20 so that it not only illuminates the spot but also provides light by which the various exposure and reference figures are readily readable through the window 48. As previously indicated, the exposure reference figures of scale 75 on dial 70 constitute clear areas on a black background, the same being true of the exposure figures of scale 73 on dial 70. The contrast figures of scale 55 on dial 50, on the other hand, are in black upon a clear background.

The grease spot type of photometer is selected in preference to the photocell type because it is so much less expensive and at the same time is equally satisfactory for the purpose. The neutral density wedge is preferred to a rheostat as the means of controlling illumination of the spot because a rheostat changes the color temperature of the source of illumination, making it difficult to secure accurate comparisons of the illuminated spot with adjacent extraneously illuminated areas of the stationary dial. The neutral density wedge is preferred to a distance adjustment as a means of varying light intensity at the spot because it permits the instrument to be so much more compact and makes it much easier, therefore, to position the spot accurately beneath a predetermined area of the projected image. The neutral density wedge is also preferred to a diaphragm as a means of controlling the intensity of illumination of the spot because it provides a much simpler and cheaper way of accomplishing the result with accuracy, where a diaphragm is not already available and is in any event more flexible.

So far as concerns the relative movement of the dials with slide rule effect to automatically show the exposure time opposite a symbol indicative of the proper grade of contrast of paper to be used, it will be apparent to those skilled in the art that many other types of relatively movable slide rule dials might be used with effect equivalent to that shown. I desire to include within my invention, in its broader aspects, any relative arrangement of slide rule dials and any relative direction of movement thereof where the dials are connected to independent light balancing means correlated to give a differential reading shown by the relative positions of the dials.

With reference to the face of the stationary dial 40, in practice this is preferably made a neutral gray of intermediate tone to permit the projected image to be focused thereon so that the highlights and shadows may be registered with the spot in accordance with the procedure above outlined. At the same time the neutral tone is sufficiently dark to preclude undue glare such as might affect the reading. To avoid interference with the reading the safe light is only used alternatively with the photometer bulb, since illumination from the safe light both in color and in light value, would affect the accuracy of the desired reading if the safe light were not extinguished before the reading was taken.

It is to be noted that all of the dials and spacers of this instrument are mounted on the closure 21. The movable dials are all pivoted on the rivet or post 22 which is fixed centrally on the closure 21. The stationary dial and its supporting plate 42 are mounted in the bezel ring 37, the arms 38 of which are screwed to the closure 21. As a result of this arrangement it is only necessary that the closure have a friction fit upon the case 20 and it may readily be removed, with all of the dials, whenever it is necessary to replace the bulb 25. However, due to the fact that the resistor cuts the current supplied to the bulb to a voltage only two-thirds that for which the bulb is graded, the bulbs in practice have been found to last indefinitely.

The exposure meter

The exposure meter shown in Figs. 10 to 15 makes use of some of the principles above described, but instead of being designed for the exposure of projection of prints, it is specifically designed for use in determining the proper exposure of film in a camera. Like the enlarging meter, the exposure meter takes a differential reading which, in this instance, serves to indicate color values or so-called range of color temperature. This is useful not alone in color photography, but also in black and white photography and in the choice of proper media for the particular light conditions. With orthochromatic film, relatively insensitive to red, the operator observes the "cyan" spot described hereinafter to get a reading into which the effect of red light does not appreciably enter. In this meter, unlike the enlarging meter, the exposure scales should be in logarithmic ratios and the density wedge should show corresponding rates of density change to correctly indicate film exposure and filter factors.

The case 200 of the exposure meter is similar to case 20 of the enlarging meter and is similarly provided with a closure 210 corresponding to closure 21 and upon which the several dials are all mounted in the same manner in which the dials are mounted in the device shown in Figs. 1 to 7.

In the exposure meter the top plate 98 has a reinforcing bead 99 at its margin, and is supported by integral arms 380 preferably located approximately diametrically opposite each other and connected to the closure 210.

At its front the top plate 98 might carry a scale 100 of film speeds rated in any desired manner. At 101 it is provided with an index of typical scenes. About the pivot post 102 the top plate 98 has a circular extension rearwardly of the instrument at 103, but otherwise it is cut away to provide a full size arcuate window continuous about the case for approximately 180 degrees.

Immediately underlying the top plate 98 is a dial 105 marginally provided with a scale 106 of diaphragm stops and provided with an opening at 107 whereby said dial is fulcrumed on the pivot post 102. An arcuate window at 108 precludes this dial from interfering in any way with the illumination of the two photometric spots 109 and 110 which are located in immediate proximity to each other on face plate 98. The translucent spots 109 and 110 and the respective opaque areas 111 and 112 are preferably colored in complementary colors. The color is preferably incorporated in the translucent area itself but may be provided by an underlying filter if desired. Assuming spot 109 and annular area 111 to be colored yellow, the spot 110 and annular area 112 might be colored cyan, which is a color that eliminates red.

Similarly, assuming spot 109 and area 111 to be blue violet, the spot 110 and area 112 might be colored red.

Dial 105 has a radially extending arm 114 which projects from the beaded margin 99 of top plate 98 and carries a numerical scale 115 which is associated with the fixed scale 100 on the top plate. The symbols on scale 115 are preferably logarithmic, such as 1, 2, 4 and 8, and the ratios of numbers in associated scales must correspond. These represent filter factors. It is possible by a manipulation of the handle 116, to so manipulate the scale 115 and the underlying dial 105 as to register any of the filter factor symbols with any of the film speed symbols of scale 100 on the top plate.

Figure 13:
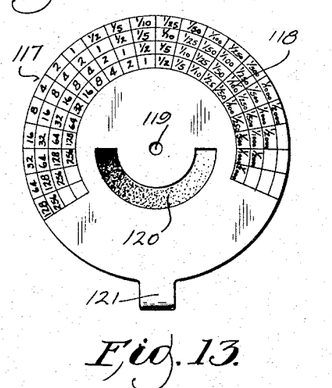
Fig. 13 is a similar view of the second disk below the top plate.
Figure 14:
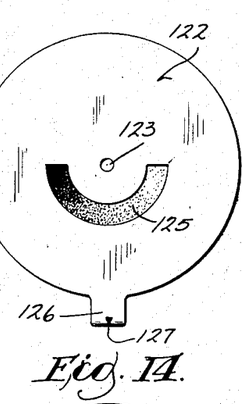
Fig. 14 is a similar view of the third disk below the top plate.

Underlying dial 105 is dial 117 separately illustrated in Fig. 13. In the 180 degree window provided by cutting away the top plate, dial 117 is provided with a scale 118, much of which is visible in Fig. 10, all of which is disposed at a greater radius than scale 106 of dial 105. The scale 118 is made up of symbols representing proper exposures preferably numerically indicated in seconds and fractions of a second. An aperture 119 in the center of dial 117 is rotatably pivoted on pivot 102. At the same radius at which dial 105 is provided with the arcuate window 108 underlying the spots 109 and 110, dial 117 is provided with a gray scale or light wedge 120. A tab 121 projects from beneath the top plate 98 for the manipulation of dial 117.

Beneath dial 117, and preferably separated therefrom by a spacer such as is disclosed at 67 in Fig. 3, is a dial 122 (Fig. 14) having a pivot opening at 123 for mounting upon the rivet post 102 and provided at 125 with a gray scale or light wedge similar to that shown at 120 in dial 117. The projecting tab 126 not only permits of the adjustment of dial 122, but carries a pointer 127 which co-operates with a graduated scale 128 on the side of case 200 which is representative of color temperature.

Figure 15:
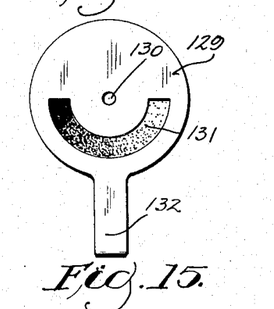
Fig. 15 is a similar view of the fourth disk below the top plate.

At some point in the series of dials is the calibrating dial 129 shown in Fig. 15. It has an opening 130 to be pivoted on the rivet 102 and is provided with a gray scale or light wedge 131 similar to those already described. Its tab 132 is of such radius that it does not materially project from beneath the top plate 98 but is barely accessible for preliminary manipulation.

Figure 10:
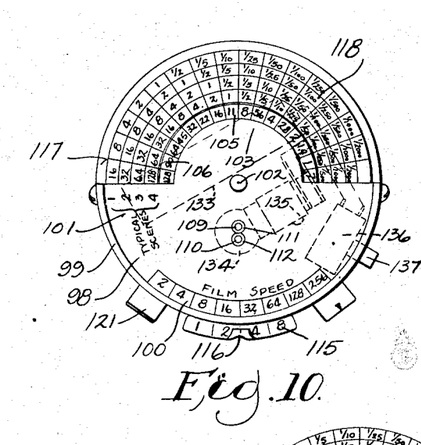
Fig. 10 is a view similar to Fig. 1 showing a modified photometer particularly devised for color work.
Figure 11:
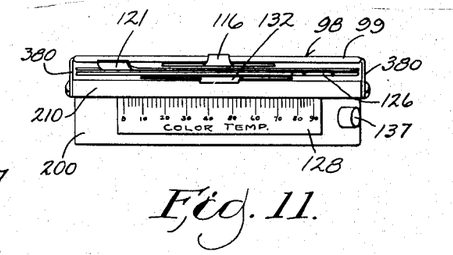
Fig. 11 is a front elevation of the device shown in plan in Fig. 10.
Figure 12:
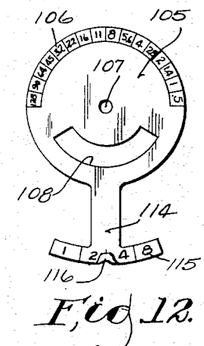
Fig. 12 is a plan view of the first disk below the top plate of the device shown in Fig. 10.

Within the case, as shown in dotted lines in Fig. 10, there is a battery 133, a photometer bulb 134, a socket 135, and a push button switch 136, the button 137 of which projects for manipulation. The closure 210 may readily be removed from the case to afford access either to the battery or the bulb for replacement, all of the several dials of the set as above described being removable with the closure 210.

The device is used as follows:

Calibration to meet conditions peculiar to the particular use or a particular situation or to enable the user to produce negatives of greater or less than average density, is made by trial and error adjustment of the calibrating dial 129 shown in Fig. 15. This dial, once adjusted to suit the requirements, will ordinarily be left unchanged.

Dial 105 will then be adjusted by manipulation of the handle 116 to set the appropriate filter factor symbol opposite the appropriate film speed. In one scale commonly used for rating film speeds a certain color film has a rating of 8. Since, in using color film, a filter is not ordinarily employed, the symbol "1" or minimum filter factor is set opposite the film speed of 8 as shown in Fig. 10. If the operator were using a film having a speed rated at 16 and were using on his camera a filter having a factor of 2, he would use the same setting of dial 105 as shown in Fig. 10.

Dial 122 being turned clockwise to the limit of its movement to position the clearest portion of wedge 125 beneath the spots, dial 117 would now be adjusted from its extreme clockwise position in a counter-clockwise direction to gradually increase the density of light wedge 120 intervening between bulb 134 and the spots, the operator meantime holding the push button 137 to close the switch and thereby to energize the bulb. According to the atmospheric light falling upon the areas 111 and 112 and the contiguous circular translucent colored spots 109 and 110, one or the other of the spots may be extinguished first. Assuming that the operator has his camera loaded with Panchromatic film, he will adjust the dial 117 to a point midway between the points where the respective spots are extinguished, this being the average of all of the component colors of the light available. When the adjustment of dial 117 is thus made, the operator will find opposite the several symbols of scale 106 which indicate diaphragm openings, a series of four different scales representing shutter timing, the composite of four scales being here designated by reference character 118.

Referring to the index 101, the operator will find the classification most closely fitting the type of scene and, using the scale indicated by the index, he will choose the number in that scale which lies opposite the diaphragm stop he proposes to employ. For example, if he wishes to use diaphragm stop 11 and if he has an average scene, he will, under the light conditions to which the meter is adjusted in Fig. 10, give an exposure of ⅕ of a second, this being the number in that portion of the scale designated by index symbol "2." If he wishes to photograph the same scene with a diaphragm opening of 4, he will use a shutter time of 1/60 second. In practice, shutters do not always function at the speeds indicated, and if the operator finds that to be the fact with his camera he can correct for it by readjusting the calibrating dial 129 so that thereafter he will get a correct reading.

Advanced photographers, whether taking color film or black and white, desire an indication of color temperature first as affecting the exposure, and secondly as affecting the type of filter which may be appropriate under the circumstances. Color temperature is readily ascertainable with this instrument by setting dial 117 at the point at which one of the colored spots is extinguished and then adjusting dial 122 until the other of the colored spots is extinguished. As in the case of the enlarging meter, the principle involved requires the use of two separate light balancing means correlated to give a differential reading. In other words, the gray scale or density wedge 126 of dial 117, once adjusted to extinguish the first spot to be neutralized, remains effective upon the light reaching the second spot, and to its effect is added the effect of the second density wedge 125 of dial 122, so that the adjustment of dial 122 to the point where the other spot is extinguished represents the differential between the colors of the respective spots and thus is an accurate indication of relative color temperature. The color temperature chart at 128 on the front of the case may be calibrated in accordance with any desired scale.

Assuming that the translucent spot 109 and the contiguous opaque areas including area 111, are blue violet, while translucent spot 110 and the contiguous opaque areas including area 112 are red, and further assuming that the meter is exposed in the shade to light from the unclouded mid-day sky, it may be found that the blue violet light will greatly predominate over the red. The meter as disclosed is designed to permit the readings to be taken starting from the relatively clear ends of the density wedges. Accordingly the design is such that with the meter exposed to light of maximum color temperature within its range the spots will balance out simultaneously. With light of less than maximum color temperature the spot reflecting most light from the red end of the spectrum will be the first to be extinguished. Thus, under the conditions assumed, spot 110 will be first extinguished.

One of the principal objections, if not the only objection, heretofore to use of battery operated spot extinction photometers, has been attributed to the uncertainties introduced into the measurement by changes of battery strength and changes in the character of the light emitted by the bulb. The use of the two separate colored spots eliminates this objection since it makes possible at a moment's notice a check of the light emitted by the bulb to ascertain whether such light has the proper temperature to correspond to the colors used in the spots (such colors obviously being chosen with regard to the particular color temperature of the bulb furnished). If the instrument is exposed to perfectly white light and the color temperature of the light emitted by the photometer bulb is correct, both spots should be simultaneously extinguished.

Similarly, for a few cents a standard candle or any standard light source may be furnished to check the functioning of the photometer bulb and value, and the light from such candle or other source, measured in the manner above described, should give a predetermined reading of color temperature. Any deviation from the predetermined reading would show that the battery or bulb or both need replacement.

In the use of color film, any pronounced predominance either of blue violet light or red light will be immediately apparent through the procedure above outlined, whereby the two separate balancing means are adjusted to ascertain a differential representative of color temperature. The experienced operator will immediately be warned in the event of such predominance of light of one color or another, that he will not get a correct rendition of color if he exposes color film under such circumstances. In the past, manufacturers of film for the production of colored transparencies have recommended against the use of filters for the reason that there was no available way by which an inexperienced operator could ascertain what filter could safely be used without distorting color values. The use of the paired spots of complementary colors with the separate balancing means as herein disclosed, gives instantly in the form of the color temperature readings on scale 128, a factor which may be correlated with a suitable filter set to enable any desired color correction to be made, so that pictures may successfully be taken with correct color rendition under adverse circumstances which now preclude the attainment of correct color values.

I claim:

1. In a photometer of the "grease spot" type for comparing light from a plurality of sources, the combination with a spot and spot illuminating means of substantially fixed intensity and color temperature, of a plurality of density wedges separately adjustable and cumulatively effective between said means and the spot, and slide rule parts relatively adjustable and with which the respective density wedges are connected, said parts being provided with complementary indicating means correlated to give a differential reading of the difference between the effect of one of said wedges and the sum of the effect of said one wedge and at least one additional wedge.

2. A photometer of the "grease spot" type comprising the combination with translucent spot means and a concealed source of spot illumination, of a plurality of individually adjustable means for varying the intensity of illumination of said spot means from said source, the effect of which upon the illumination of such spot means is cumulative, and correlated scale means operatively connected with said illumination varying means for taking a reading of the difference between the extinction effects of the respective individually adjustable means.

3. In a photometer of the light balancing type, the combination with a case and an illumination source housed therein, of translucent spot means subject to illumination from said source, a plurality of individually adjustable slide rule parts, and means connected with said parts for individually varying the effective illumination of said spot from said source, the variance effected by the individual adjustment of one of said parts being cumulative upon the functions affected in the individual adjustment of the other, one of said slide rule parts including scale means calibrated in terms of contrast for indicating the relative movement of the respective parts.

4. In a photometer of the "grease spot" type, the combination with a case and an illumination source housed therein, of translucent spot means subject to illumination from said source, a plurality of individually adjustable density wedges intervening between said source and spot, individual slide rule parts operatively connected with the respective density wedges to partake of the adjustment thereof and having correlated scales, one of said scales having symbols indicative of the effect of one of said density wedges and the other having means indicative of the difference between the effect of a first of such density wedges and the cumulative effect of at least one additional of said wedges.

5. In a photometer of the "grease spot" type, the combination with a case and a light source housed therein, of translucent spot means supported from said case, a plurality of rotatable dials intervening between said light source and said spot means, density wedges carried by the respective dials, and scale means operatively connected for interaction in the movement of the respective dials for indicating the movement of one of said density wedges required to extinguish said spot means under predetermined circumstances, and the difference between the movement of said first density wedge and another of said density wedges required for the extinction of said spot means by their cumulative effect under other circumstances.

6. A photometer of the light balancing type comprising a plurality of superposed and individually adjustable slide rule parts, translucent spot means, a source of illumination, means connected with one of said parts for varying the illuminating effect of said source upon said spot means, means operatively connected with the other of said parts cumulative to said first means for further varying the effect of the illumination of said source upon said spot means, an exposure table carried by one of said parts, a relatively fixed reference associated with said table to indicate exposure according to the adjustment of the part carrying said table, and means calibrated in terms of contrast and connected with the other of said slide rule parts providing a correlated reading upon said table.

7. In a photometer of the light balancing type, the combination with a case having a dial provided with a window and with a translucent spot, of a source of illumination within the case for illuminating said spot, a dial adjustable with respect to said window and provided with an exposure table, said adjustable dial having means for varying the effective illumination of said spot from said source, and a second dial intervening between the first and second mentioned dials and including means for framing selected portions of said table in accordance with the adjustment of said second dial, said second dial having means for independently varying the effective illumination of said spot from said source cumulative to said first mentioned means, whereby to indicate a differential between the cumulative effects of the respective dials, together with means calibrated in terms of contrast with which said framing co-acts.

8. A photometer of the light balancing type comprising the combination with a case and a source of illumination therein, of spot means positioned to be illuminated from said source, said case having a window, a plurality of dials superimposed for independent relative rotation within said case and having individual density wedges cumulatively effective between said source and spot means to vary the illumination on said spot means, one of said dials carrying a table with circumferential and radial rows of exposure symbols positioned to be displayed through said window in accordance with the position of said one dial, the other dial intervening between said one dial and the window and having framing means positioned at different radii whereby to indicate exposure figures at different radial points on said one dial according to the cumulative effect of the adjustment of the second dial.

9. A photometric device of the spot extinction type comprising the combination with means providing a plurality of differently colored comparison field means including translucent spots, light means for the concurrent illumination of the respective spots, one of said light means comprising a source of known color temperature, and a plurality of independently operable means for varying the effective illumination of said spots from said light means, together with relatively movable scale parts in operative connection with the respective illumination varying means, whereby the relative positions of the parts are indicative of the difference between the effect of one of said means and the sum of the effect of both of said means, one of said scale parts being calibrated in terms of color temperature.

10. A photometric device of the light balancing type comprising the combination with a light source, of a plurality of translucent spots differently colored in complementary colors, each of said spots having a contiguous opaque area of like color for comparison, and a density wedge adjustable between said source and the respective spots and effective for varying the illumination of said spots from said source, and scale means co-acting with said wedge to indicate its effect on the illumination of said spots.

11. A photometric device of the light balancing type comprising the combination with a light source, of a plurality of translucent spots differently colored, each of said spots having a contiguous opaque area of like color for comparison, a plurality of density wedges individually adjustable between said source and the spots and cumulatively effective upon both spots to vary the illumination thereof from said source, and scale means co-acting with said wedges to indicate their effect on the illumination of said spots.

12. A photometric device comprising the combination with means providing a plurality of comparison field means including translucent extinction spots and differentially colored, and means for the illumination of the respective spots, of a film speed scale disposed in proximity to said spots, a dial rotatable with respect to said scale and providing contiguous to the film speed scale a filter factor scale for correlation therewith and having elsewhere a scale of diaphragm stops, a second dial having a scale of exposure times contiguous to the scale of diaphragm stops and correlated therewith, said second dial being provided with a density wedge intervening between said spots and said light source, a third dial having a second density wedge intervening between said light source and said spots, the effect of said second density wedge in regulating the light reaching said spots from said source being cumulative to the effect of the first density wedge upon the illumination of said spots from said source and means providing a color temperature scale with respect to which said third dial is associated for calibrated adjustment.

13. A photometer comprising the combination with a comparison field adapted to be illuminated by a light source to be measured, of a separate source of illumination for such field, a plurality of individually adjustable cumulatively effective means for varying the relative light falling upon said field, and at least three slide rule members having co-acting portions for giving readings dependent upon the relative positions of the several members, certain of which are connected with the respective means for the adjustment thereof and in co-operative relation with each other, one of said slide rule members having a table of columns of exposure figures, a second of said members having staggered framing means movable across said table to designate exposure figures at different levels in the respective columns, whereby the position in a given column of the figure designated by said framing means is indicative of the comparative positions of the respective light varying means, a third member being provided with means for indicating a particular column of exposure figures wherein said second slide rule member designates a figure at a particular level, the figures in the column designated being the correct exposure figures and the level of the particular figure as indicated by said second member indicating the degree of contrast of the photographic medium to be exposed to the light source measured.

14. A photometer for use in photographic projection printing to indicate the correct exposure and correct contrast grade of photographic printing medium, said photometer comprising the combination with a case and a source of illumination therein, of a comparison field including a spot positioned to be illuminated from said source, a plurality of superimposed disks one of which is uppermost and relatively stationary and provided with a radial indicator, other disks underlying said stationary disk comprising rotatable dials, the lowermost thereof having a table of exposure figures in radial rows circumferentially spaced and in which the figures in each radial row are graduated with respect to figures correspondingly located in successive rows, the intermediate dial having framing means progressively offset radially, whereby exposure figures in a given column registered in the movement of the lowermost dial with the indicator in the relatively stationary disk first mentioned will be designated by the offset framing means of the dial last mentioned at different levels in the said registering column according to the differential positions of the respectively movable dials, and means connected with the respectively movable dials for cumulatively varying the amount of light from said source of illumination reaching said spot means from the source within the case.

15. A photometer of the light balancing type for indicating the correct exposure in projection printing and the correct grade of contrast of photographic medium to be used, said photometer comprising the combination with a case and a source of illumination therein, of a relatively stationary top disk provided with a comparison field and a translucent spot associated with the field and with a radial window and grade designations associated in radial series with the window, an underlying rotatable disk having a density wedge movable between the illumination source and the spot for varying the intensity of illumination of the spot from said source, said underlying disk also having columns of exposure figures in which substantially identical figures are arranged in radial columns, the figures of successive columns being progressively variant and said underlying disk being rotatable not only to vary the illumination of said spot but to register different columns of figures with the radial window of the disk first mentioned, and an intermediate rotatable disk carrying a density wedge of arcuate form rotatable between the spot and the source to vary the light reaching the spot from said source through the density wedge of said underlying disk, the respective wedges being independently adjustable and cumulative in their effect upon the light reaching the spot from such source, said intermediate disk having a succession of radially offset framing means adapted in the rotation of said disk to move to different radial positions with respect to the radially extending window of the disk first mentioned, whereby to indicate in said window an exposure figure at a particular level in the column therein displayed, the level of the exposure figure indicated falling opposite an aforesaid grade designation with which the first mentioned disk is provided, whereby said figure indicates exposure and the location of the figure indicates the appropriate grade of exposure medium as a function of relative movement of the intermediate disk.

16. A photometric device of the light balancing type, comprising the combination with a housing and a source of illumination therein, of comparison field means positioned to be illuminated from said source and from an external source, a plurality of independently operable means cumulatively effective to vary the intensity of the illumination of said field from one of said sources, a first indicator comprising a scale and indicating means operatively connected to a first light varying means to indicate the effect of said first light varying means on said field means, and a second indicator comprising a scale and indicating means operatively connected with another of the plurality of light varying means for indicating the difference between the effect of said first light varying means and the sum of the effect on said field means of said first light varying means and said second light varying means.

17. A photometric device of the light balancing type comprising the combination with a housing and a source of illumination therein, of a plurality of comparison field means of different color, said field means being positioned to be illuminated from said source and from an external source, a plurality of light intensity varying means independently operable and cumulatively effective for varying the illumination of said field means from at least one of said sources, a first indicator including a scale and indicating means operatively connected to one of said light varying means to indicate the effect of one of said light varying means on any one of said field means, and a second indicating means comprising a scale and an indicator operatively connected to a second light varying means to indicate the difference between the effect of said first light varying means on one of said comparison field means and the sum of the effect of said second light varying means and said first light varying means upon the illumination reaching another one of said comparison field means.

18. A photometric device comprising a plurality of differently colored comparison field means, a first source of illumination for the respective field means, both of said field means being also exposed to illumination from an unknown source, means for varying the intensity of illumination of the respective field means from one of said sources, a second means independently operable for varying the illumination of the respective field means from one of said sources, and comparison scale means operatively connected with the respective illumination varying means, said illumination varying means being cumulatively effective and said scale means comprising means for ascertaining the difference between the effect of one of said light varying means and the cumulative effect of both of said light varying means.

19. A photometric device of the light balancing type comprising the combination with a predetermined light source, of a plurality of differently colored comparison fields, each of said fields including a translucent screen exposed to be illuminated from the rear from said first source, both of said comparison field means being correspondingly exposed for illumination from the front from another source, means for correspondingly varying the intensity of illumination reaching the respective comparison field means from one of said sources, a second means for correspondingly varying the illumination reaching said comparison field means from one of said sources, and indicating means calibrated in terms of color temperature and including scale parts operatively connected with the respective illumination varying means and movable in correlated relation to each other, whereby said parts are adapted to afford in terms of color temperature a reading of the difference between the effect of one of said illumination varying means and the sum of the effect with said first illumination varying means of the effect of the other illumination varying means.

20. A method of ascertaining the color temperature of light from a given source, such method comprising projecting said light onto a portion of each of two differently colored fields and balancing the intensity of each of said field portions with a known intensity of illumination from a second source projected on an adjacent portion of each field, determining the ratio of said known intensities, and comparing said ratio with ratios corresponding to known color temperatures.

WOLCOTT S. KINNARD.